(12) United States Patent
Takai et al.

(10) Patent No.: US 9,310,006 B2
(45) Date of Patent: Apr. 12, 2016

(54) HOSE CONNECTOR

(71) Applicant: NIFCO INC., Yokohama-shi, Kanagawa (JP)

(72) Inventors: Motoharu Takai, Fujisawa (JP); Tsuyoshi Okazaki, Yokohama (JP)

(73) Assignee: Nifco Inc., Yokohama-shi (JP)

( * ) Notice: Subject to any disclaimer, the term of this patent is extended or adjusted under 35 U.S.C. 154(b) by 226 days.

(21) Appl. No.: 14/064,272

(22) Filed: Oct. 28, 2013

(65) Prior Publication Data
US 2015/0115599 A1   Apr. 30, 2015

(30) Foreign Application Priority Data
Oct. 25, 2013   (JP) .................. 2013-221941

(51) Int. Cl.
*F16L 37/18* (2006.01)
*F16L 33/22* (2006.01)

(52) U.S. Cl.
CPC .................... *F16L 33/225* (2013.01)

(58) Field of Classification Search
CPC ...... F16L 33/225; F16L 33/223; F16L 33/226
USPC .......... 285/242, 259, 314, 245, 255
See application file for complete search history.

(56) References Cited

U.S. PATENT DOCUMENTS

| 4,278,279 | A | * | 7/1981 | Zimmerman | 285/255 |
| 4,577,894 | A | * | 3/1986 | Wake | 285/255 |
| 4,750,764 | A | * | 6/1988 | Gibellina | 285/255 |
| 4,903,995 | A | * | 2/1990 | Blenkush et al. | 285/255 |
| 5,284,368 | A | * | 2/1994 | Oetiker et al. | 285/255 |
| 6,231,085 | B1 | * | 5/2001 | Olson | 285/255 |
| 6,695,355 | B1 | * | 2/2004 | Giuffre | 285/255 |
| 6,871,880 | B1 | * | 3/2005 | Olson | 285/245 |
| 7,497,476 | B2 | * | 3/2009 | Powell et al. | 285/242 |

FOREIGN PATENT DOCUMENTS

JP    2006300127 A    11/2006

* cited by examiner

*Primary Examiner* — David E Bochna
(74) *Attorney, Agent, or Firm* — Marshall & Melhorn, LLC

(57) ABSTRACT

A hose connector comprises a connector main body (12, 112, 190), a lock member (14, 82, 88, 94, 114), a cam mechanism (70, 170: 68, 168, 194) that converts the rotational movement of the lock member into an axial movement thereof, and clamping features (24; 42, 142) formed in the inner and outer circumferential surfaces of the lock member and the connector main body which clamps a hose end by moving axially toward each other. The hose end can be connected to a pipe or a pipe-like member with ease in a reliable manner and without requiring a tool.

10 Claims, 15 Drawing Sheets

HOSE CONNECTOR

BACKGROUND OF THE INVENTION

The present invention relates to a hose connector for connecting a hose, and in particular to a hose connector suitable for use in a washer tank or a washer device for connecting a hose for transporting washer fluid to a windshield or a headlamp.

A hose connector is required to be able to not only fixedly secure a hose end but also prevent leakage of fluid in the hose. An annular metallic band is often used for connecting a hose to an end of a pipe. In such a case, an end of the hose is passed into the annular metallic band, and then fitted onto the end of the pipe. The annular metallic band is slid onto the part of the hose which is fitted onto the pipe, and the annular metallic band is tightened by using a special tool so that the hose is clamped between the annular metallic band and the pipe along the entire circumference. Thereby, the hose is securely connected to the pipe in a fluid tight manner. However, this requires the special tool, and some effort is required for the worker. Furthermore, an inspection is required to ensure that the connection has been properly made.

JP2006-300127A discloses a mounting structure for connecting a rubber hose to a pipe with more ease. This mounting structure employs a fastening sleeve, instead of the metallic band, and a means is provided for engaging the fastening sleeve with the pipe. This engagement means comprises an engagement projection provided on the pipe, and an engagement groove provided in the fastening sleeve such that the fastening sleeve is caused to advance in the axial direction as the fastening sleeve is turned around the axial line thereof with respect to the pipe. The free end of the pipe is provided with an annular radial projection, and the inner circumferential surface of the free end of the fastening sleeve is provided with a pressing portion which is tapered toward the outer end thereof. With the free end of the hose passed into the fastening sleeve, the fastening sleeve is fitted onto the pipe. The fastening sleeve is then slid axially to the side of the pipe, and turned around the axial line thereof to force the fastening sleeve to the side of the pipe until the pressing portion comes adjacent to the annular radial projection, and the hose is firmly clamped between the pressing portion and the annular radial projection. Thereby, the hose and the pipe can be securely connected to each other in a fluid tight manner.

However, according to this prior art, before connecting the hose to the pipe, the fastening sleeve is required to be fitted on the hose, and the engagement projection is required to be aligned with the engagement groove. Therefore, a further improvement is desired to the work of connecting a hose to a pipe.

SUMMARY OF THE INVENTION

In view of such problems of the prior art, a primary object of the present invention is to provide a hose connector that allows a hose to be connected to a pipe or a pipe-like member with ease in a reliable manner.

A second object of the present invention is to provide a hose connector that can achieve a reliable connection without requiring a special tool.

According to the present invention, such objects can be accomplished by providing a hose connector, comprising: a connector main body including an inner tubular portion having a first engagement feature formed at a base end of an outer circumference thereof; a lock member including an outer tubular portion configured to be fitted on the inner tubular portion so as to define an annular gap between an outer circumferential surface of the inner tubular portion and an inner circumferential surface of the outer tubular portion, the outer tubular portion being formed with a second engagement feature configured to engage the first engagement feature; wherein the first and second engagement features jointly form a cam mechanism that causes the lock member to axially move from an unlocked position to a locked position when the lock member is turned around an axial line thereof in a prescribed direction; and wherein the inner tubular portion is provided with an annular enlarged diameter portion on the outer circumferential surface, and the outer tubular portion is provided with an annular reduced diameter portion on the inner circumferential surface thereof in such a positional relationship that the annular enlarged diameter portion and the annular reduced diameter portion are axially adjacent to each other when the lock member is in the locked position, and axially spaced apart from each other in the unlocked position such that a free end of a hose can be clamped between the annular enlarged diameter portion and the annular reduced diameter portion by inserting a free end of a hose in the annular gap between the outer tubular portion and the inner tubular portion when the lock member is in the unlocked position and turning the lock member in the prescribed direction to the locked position.

The user is only required to pass the end of a hose into an annular gap defined between the inner circumferential surface of the lock member and the outer circumferential surface of the connector main body, and turn the lock member in a prescribed direction. The hose can be thereby clamped between the annular enlarged diameter portion and the annular reduced diameter portion. By appropriately configuring the cam mechanism, the force required for turning the lock member from the unlocked position to the locked position can be optimally selected, and the need for a tool in locking or unlocking the hose connector can be eliminated.

When the inner circumferential surface of the lock member comprises a flared front end, and the outer circumferential surface of the connector main body comprises a tapered front end, the hose end can be inserted into the annular gap with ease.

According to a certain aspect of the present invention, the annular enlarged diameter portion and the annular reduced diameter portion are located such that a transition from the unlocked position to the locked position is achieved by a forward movement of the lock member relative to the connector main body.

Therefore, the front end of the connector main body may be projected forward from the front end of the lock member in the unlocked position. Because the hose end may be conveniently guided by the projecting front end of the connector main body, the fitting the hose end into the annular gap is facilitated. In the locked position, the front ends of the connector main body and the lock member may coincide with each other to minimize the axial dimension of the hose connector.

According to another aspect of the present invention, one of the first and second engagement features includes a resilient engagement piece configured to retain the connector main body and the lock member to each other by engaging a cooperating piece of the other of the first and second engagement features in the unlocked position.

Therefore, the connector main body and the lock member may be stored and handled as a single assembly ready for the hose end to be inserted therein, and the possibility of losing a part of the hose connector can be avoided.

A particular simple structure can be achieved if the resilient engagement projection comprises a projection formed in a part of a beam member defined by a slot formed in the outer tubular portion of the lock member.

According to yet another aspect of the present invention, the cam mechanism comprises a cam follower member provided on the inner circumferential surface of the lock member and a cooperating cam groove formed on the outer circumferential surface of the connector main body, and wherein the resilient engagement piece comprises the cam follower member, and the cooperating piece comprises a part of the cam groove defining a rearwardly facing shoulder surface.

As the cam follower member provides the additional function of retaining the lock member and the connector main body to each other in the unlocked position, a particularly simple structure can be achieved.

According to yet another aspect of the present invention, the resilient engagement projection comprises an axial projection formed in a base end of the lock member, and the cooperating piece comprises a notch or opening defined in the connector main body so as to receive the axial projection therein in the unlocked position.

Thereby, the lock member in the unlocked position can be prevented from inadvertently being turned to the locked position unless a deliberate effort is made to turn the lock member to the locked position.

According to yet another aspect of the present invention, one of the first and second engagement features includes a resilient engagement piece configured to retain the connector main body and the lock member against relative rotation by engaging a cooperating piece of the other of the first and second engagement features in the locked position.

As the connector main body and the lock member are thereby retained against relative rotation in the locked position, any inadvertent unlocking of the hose connector can be avoided.

When the cam mechanism comprises a cam follower member provided on the inner circumferential surface of the lock member and a cooperating cam groove formed in on the outer circumferential surface of the connector main body, the resilient engagement piece may comprise the cam follower member, and the cooperating piece cooperating with the resilient engagement projection may comprise a side wall of an axially extending section of the cam groove so that the prevention of the inadvertent rotation of the lock member in the locked position can be achieved with a simple structure.

If the lock member is provided with a weakened portion which is configured to be ruptured when the lock member is forcibly turned relative to the connector main body in the locked position, any inadvertent unlocking of the hose connector can be readily discovered. Alternatively, when the hose is desired to be removed from the hose connector, the lock member may be turned with an adequate force to cause the lock member to rupture, and slip the part of the lock member clamping the hose in the axial direction until the hose becomes free from the hose connector.

According to yet another aspect of the present invention, one of the first and second engagement features includes an engagement piece configured to retain the connector main body and the lock member against relative axial movement by engaging a cooperating piece of the other of the first and second engagement features in the locked position.

As the connector main body and the lock member are thereby retained against relative axial movement in the locked position, any inadvertent unlocking of the hose connector can be avoided.

When the cam mechanism comprises a cam follower member provided on the inner circumferential surface of the lock member and a cooperating cam groove formed in on the outer circumferential surface of the connector main body, the engagement piece may comprise the cam follower member, and the cooperating piece may comprise side walls of a circumferential section of the cam groove so that the prevention of the inadvertent axial displacement of the lock member in the locked position can be achieved with a simple structure.

If the lock member is provided with a window that exposes a part of the connector main body on which a hose is to be fitted, the proper positioning of the hose when locking the hose connector can be ensured.

BRIEF DESCRIPTION OF THE DRAWINGS

Now the present invention is described in the following with reference to the appended drawings, in which.

DETAILED DESCRIPTION OF THE INVENTION

Figure 1:
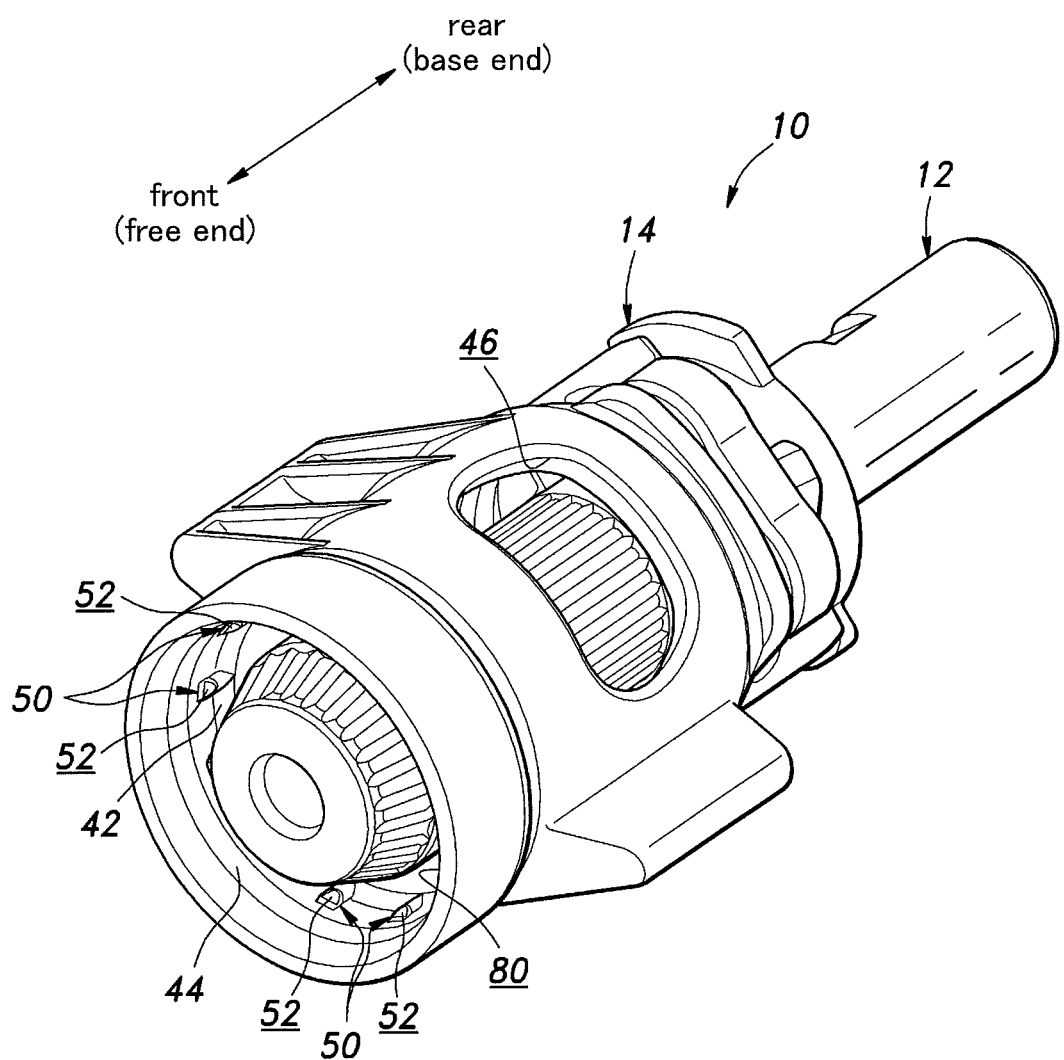
FIG. 1 is a perspective view of a hose connector given as a first embodiment of the present invention.

FIG. 1 is a perspective view of a hose connector 10 given as a first embodiment of the present invention. The hose connector 10 includes a connector main body 12 having a rear end (based end) connected to another member (such as a washer tank and a washer device) and a front end (free end) configured to be connected to a hose, and a lock member 14 fitted on the connector main body 12 for securing a hose to the connector main body 12 in a fluid tight manner. The hose to be connected to the hose connector 10 consists of flexible or elastic hose made of such material as rubber, plastics, fabric and composite material. The hose, for instance, may consist of window washer hose for conveying washing liquid to a windshield washer nozzle, headlamp washer hose for conveying washing liquid to a vehicle headlamp washer nozzle, cooling water hose, canister purge hose, general-purpose water hose and so on.

Figure 2:
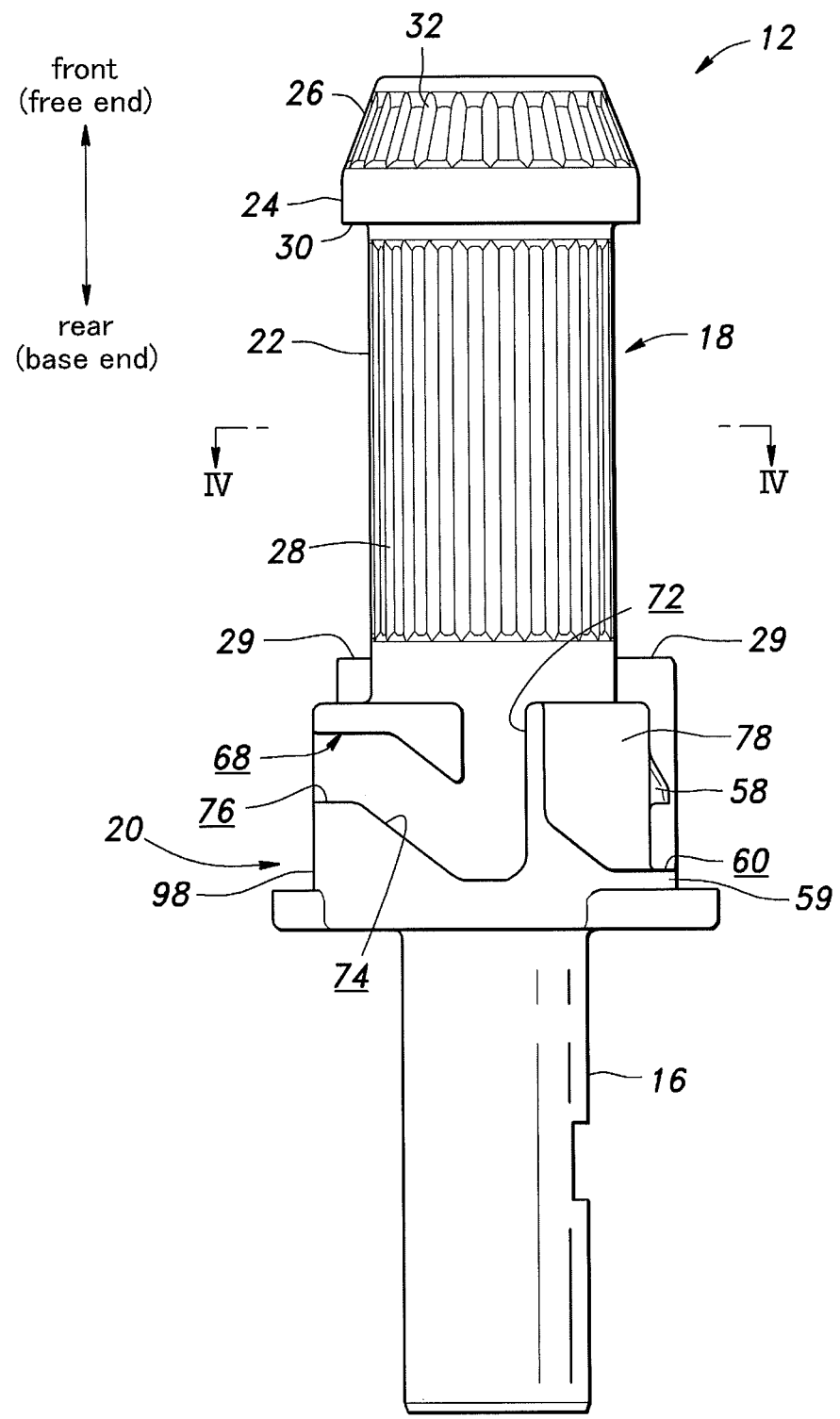
FIG. 2 is front view of a connector main body of the hose connector of the first embodiment.
Figure 3:
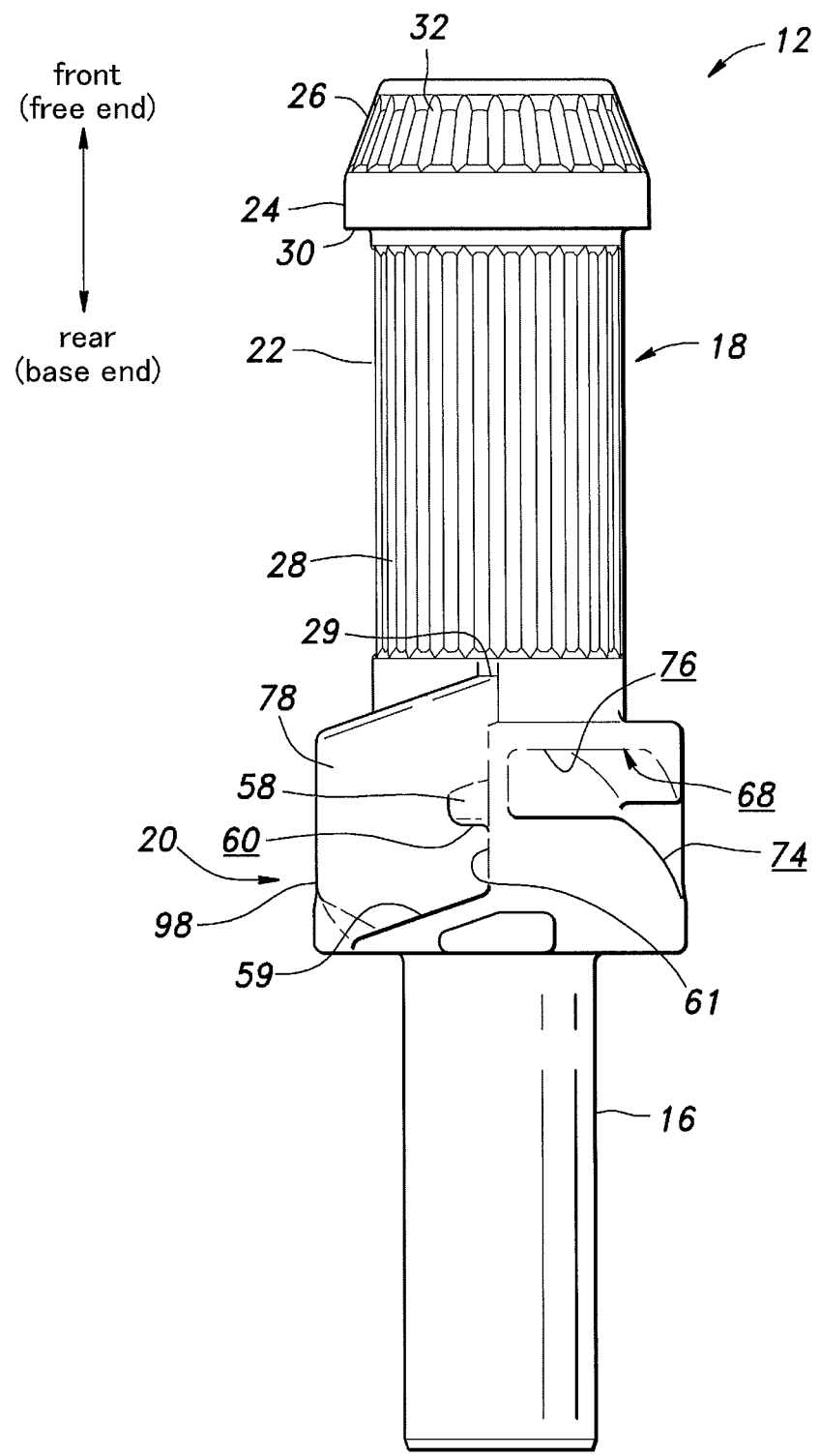
FIG. 3 is left side view of the connector main body of the hose connector of the first embodiment.

The connector main body 12 is described in the following with reference to FIGS. 2 to 4 which are a front, left side and cross sectional view of the connector main body 12, respectively. The connector main body 12 is made of molded tubular plastic member having an axial bore defined therein. The connector main body 12 includes a connecting portion 16 located in the rear (base) end thereof to be connected to or formed in a member or a device, and an inner tubular portion 18 in the front (free) end thereof to be fitted into the hose.

The member or the device to which the base end of the connecting portion 16 is connected may consist of a pipe, a liquid reservoir, a fluid feeding device or the like.

The inner tubular portion 18 is provided with a first engagement portion 20, an intermediate portion 22 and an annular enlarged diameter portion 24, an outer circumferential tapered end 26 arranged in that order from the base end thereof, all in a coaxial relationship.

The first engagement portion 20 is generally formed by an irregularly shaped cylindrical member 98, and is configured to serve as a part of the means for engaging the lock member 14 with the connector main body 12 by cooperating with a second engagement portion 38 of the lock member 14 as will be described hereinafter.

The intermediate portion 22 is tubular in shape, and is provided with a substantially constant outer diameter. The outer circumferential surface of the intermediate portion 22 is formed with a plurality of axial ribs 28 at a regular interval, and is dimensioned to be fitted into the hose. As the first engagement portion 20 has a generally larger outer diameter than the intermediate portion 22, an irregular shoulder surface 29 facing toward the free end thereof is defined therebetween.

The annular enlarged diameter portion 24 includes a cylindrical portion of a constant outer diameter which is greater than that of the intermediate portion 22 so that an annular shoulder surface 30 facing the base end is defined between the annular enlarged diameter portion 24 and the intermediate portion 22. The cylindrical portion of the annular enlarged diameter portion 24 is provided with a smooth outer surface. The outer diameter of the cylindrical portion is greater than the inner diameter of the hose in the unloaded condition thereof. However, the hose is able to undergo an elastic deformation such that the cylindrical portion can be forced into the hose without requiring any significant effort.

The outer circumferential surface of the outer circumferential tapered end 26 is formed with a plurality of axial ribs 32 at a regular interval. The outer diameter of the outer circumferential tapered end 26 (as measured with respect to the tips of the axial ribs) is substantially equal to that of the annular enlarged diameter portion 24 at the base end thereof, and tapers toward the free end thereof such that the outer diameter of the free end is smaller than the inner diameter of the unloaded hose.

Figure 5:
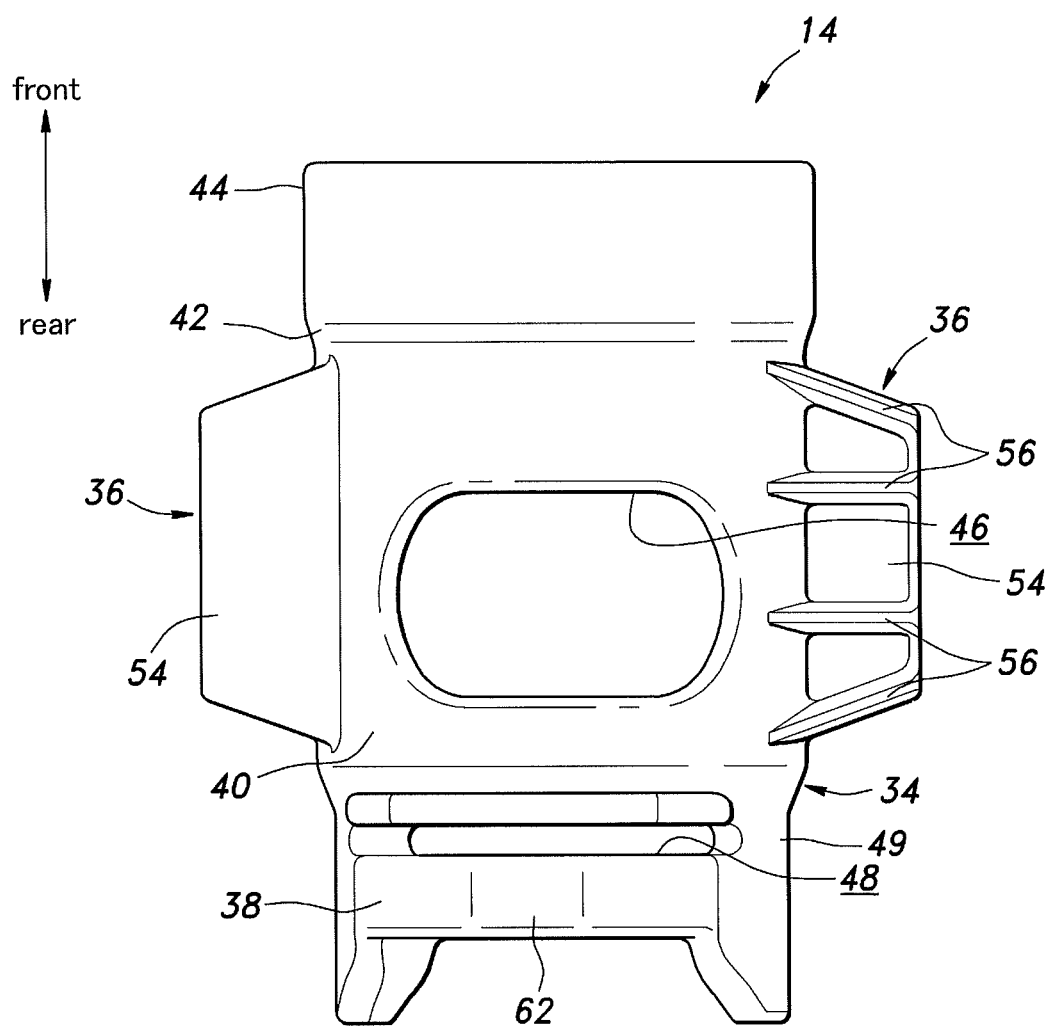
FIG. 5 is a front view of a lock member of the hose connector of the first embodiment.
Figure 6:
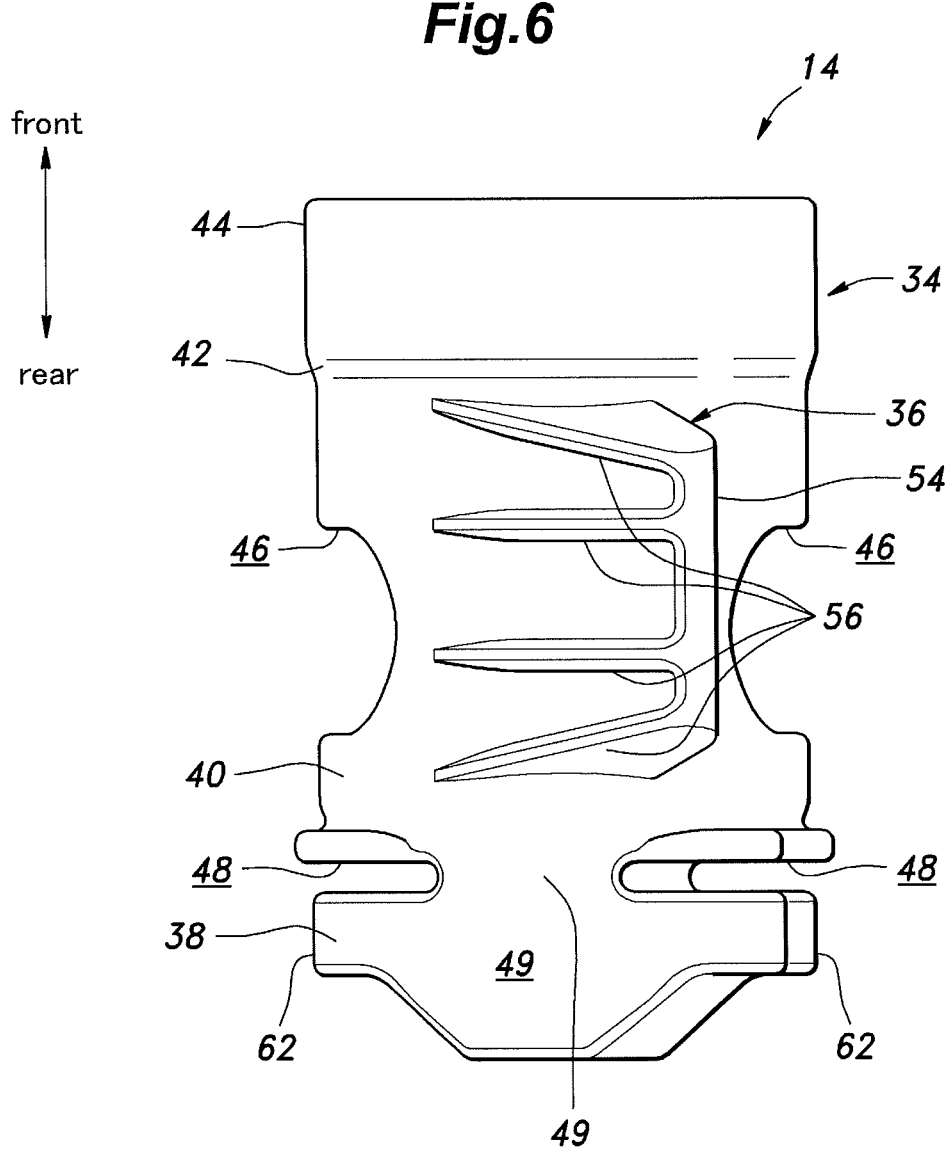
FIG. 6 is a right side view of the lock member of the hose connector of the first embodiment.
Figure 7:
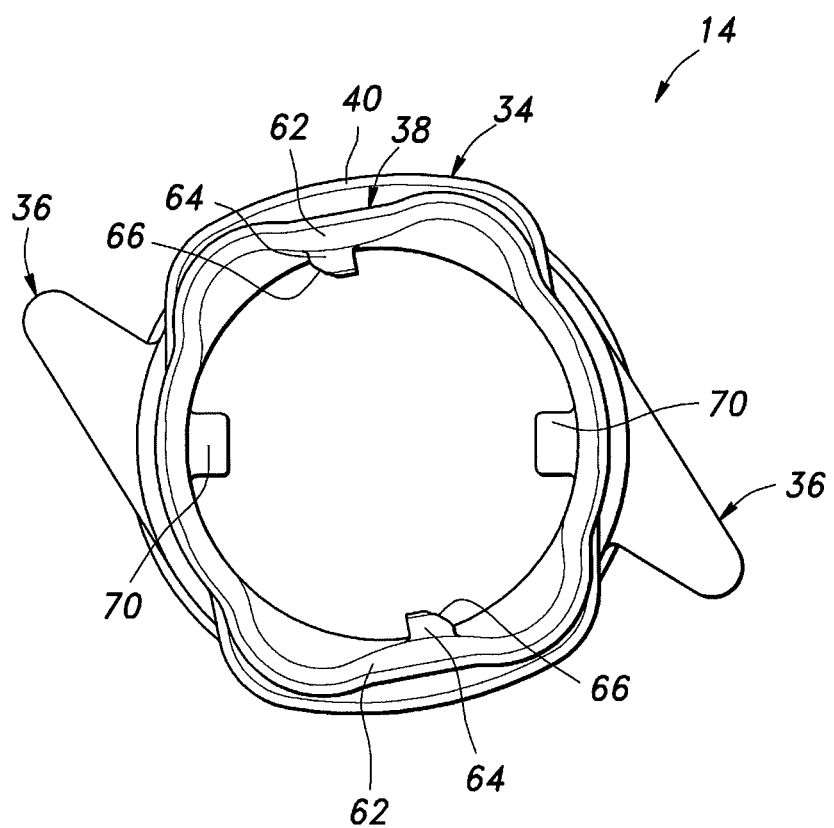
FIG. 7 is a bottom view of the lock member of the hose connector of the first embodiment.
Figure 8:
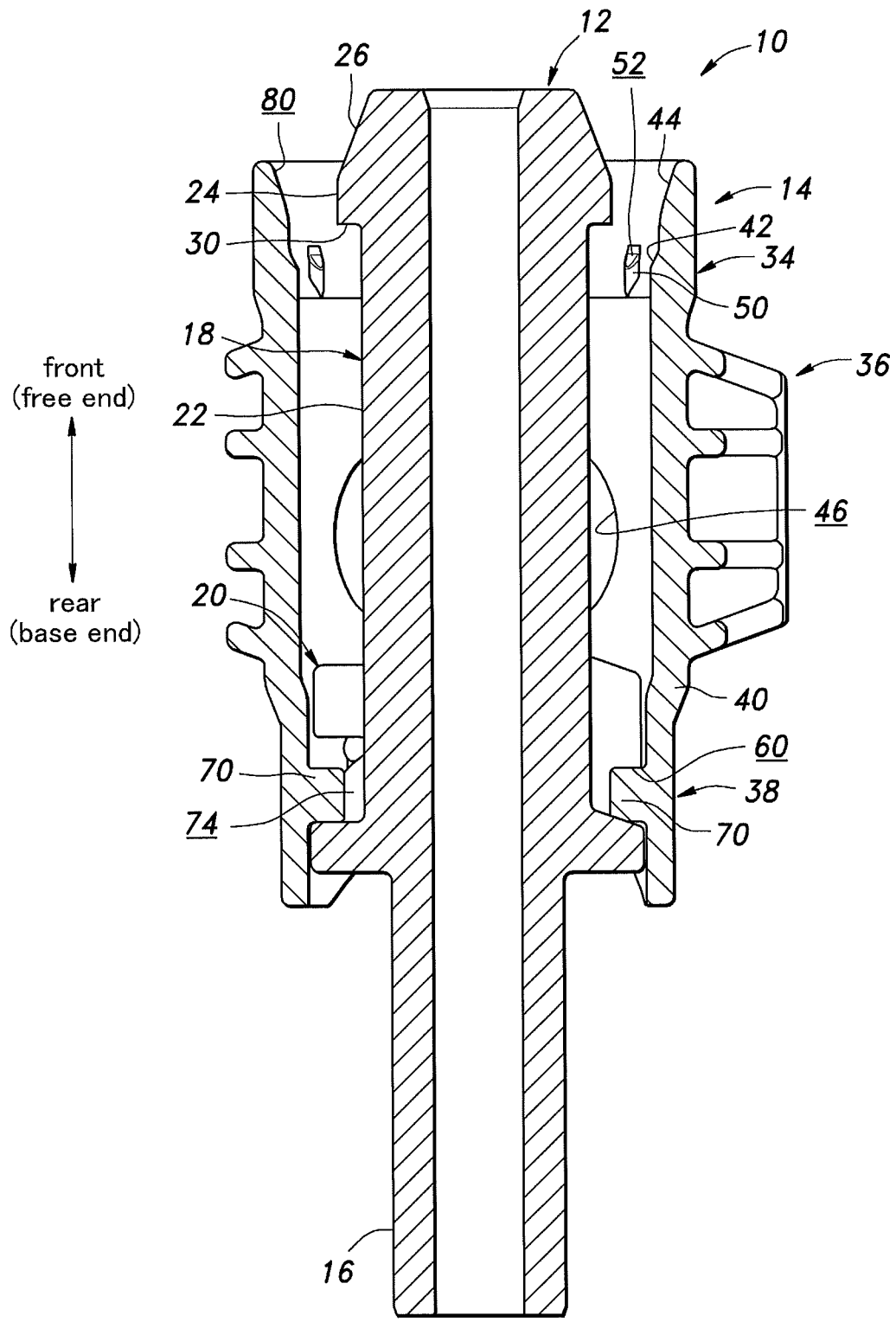
FIG. 8 is a vertical sectional view of the hose connector of the first embodiment in an unlocked position.
Figure 9:
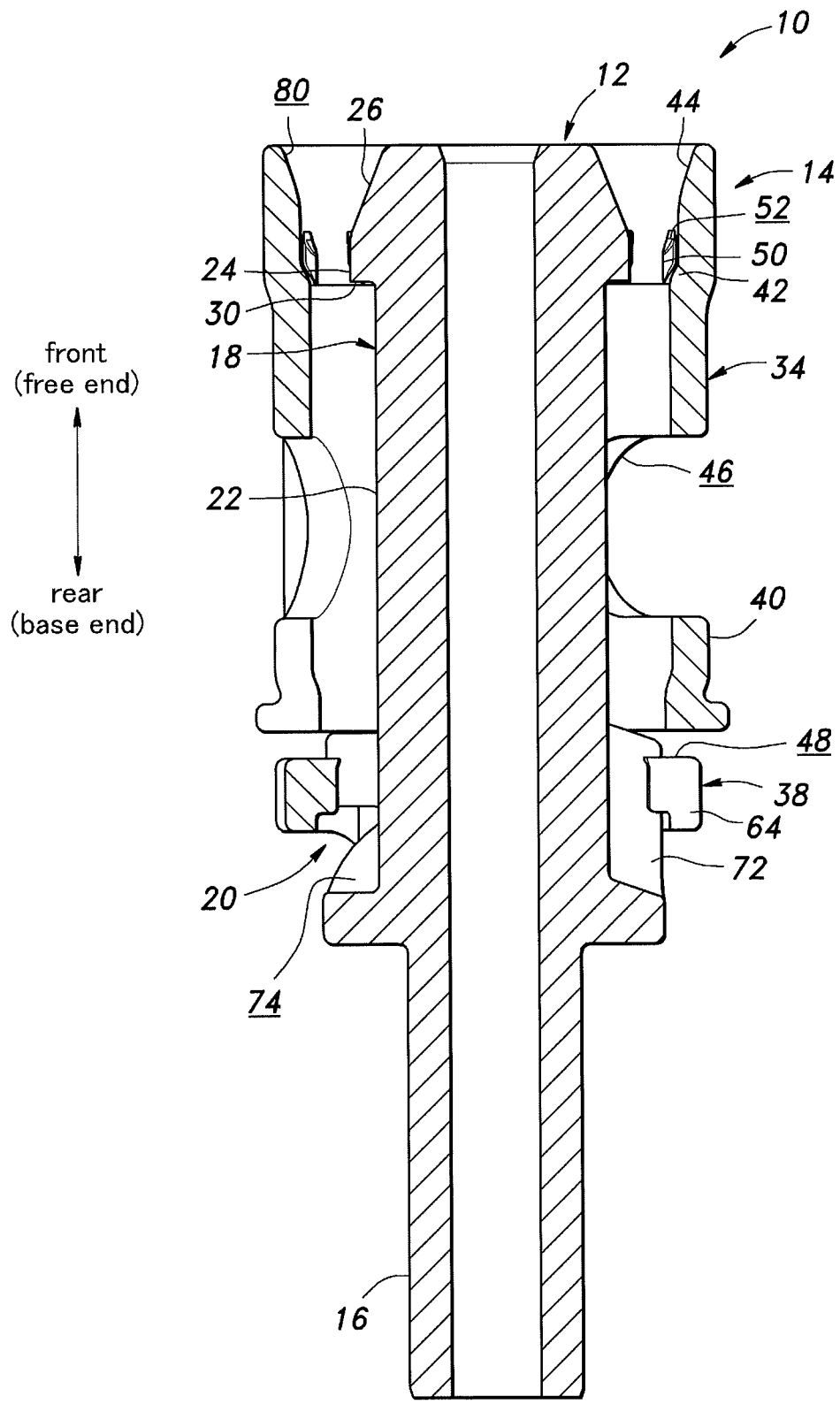
FIG. 9 is a vertical sectional view of the hose connector of the first embodiment in a locked position.

The lock member 14 is described in the following with reference to FIGS. 5 to 9. FIGS. 5, 6 and 7 are a front view, right side view and bottom view of the lock member 14, respectively. FIGS. 8 and 9 are vertical sectional views of the hose connector 10 in an unlocked and locked position, respectively. The lock member 14 comprises an outer tubular portion 34 configured to be loosely fitted onto the inner tubular portion 18 of the connector main body 12 and a pair of manipulating pieces 36 extending radially from the diametrically opposing positions of the outer circumferential surface of the outer tubular portion 34 away from each other.

The outer tubular portion 34 includes a second engagement portion 38, a tubular main body 40, a reduced diameter portion 42 and an inner circumferential tapered end 34 in that order from the rear end thereof, and a pair of windows 46 are formed in the tubular main body 40 at diametrically opposing portions thereof. The second engagement portion 38, the reduced diameter portion 42 and the inner circumferential tapered end 34 are formed with relevant features on the inner circumferential surfaces thereof.

The second engagement portion 38 is configured to securely join the connector main body 12 and the lock member 14 to each other by engaging with the first engagement portion 20 as will be discussed hereinafter.

The tubular main body 40 is provided with an inner circumferential surface that opposes the intermediate portion 22 of the connector main body 12 when the connector main body 12 and the lock member 14 are joined to each other, and is provided with the pair of windows 46 as discussed earlier. Each window 46 is slightly elongated in the circumferential direction, and allows the intermediate portion 22 of the connector main body 12 to viewed from outside. A pair of circumferential slots 48 are formed in an axial end part of the tubular main body 40 adjacent to the second engagement portion 38. The circumferential expanse of each circumferential slot 48 is slightly shorter than that of the corresponding window 46.

As shown in FIGS. 8 and 9, the inner bore of the reduced diameter portion 42 of the lock member 14 is tapered toward the rear end thereof (or flared toward the front end thereof), and the inner diameter of the base end is identical to the inner diameter of the tubular main body 40. A plurality of reduced diameter projections 50 project radially inward from the inner circumferential surface of the reduced diameter portion 42 along a common circumferential circle (see FIG. 1). Each reduced diameter projection 50 is formed with an axial through hole 52. Therefore, when subjected to a radial pressure, the reduced diameter projections 50 are allowed to undergo an elastic deformation owing to the collapsing of the axial through holes 52 such that the inner diameter defined by the tips of the reduced diameter projections 50 is reduced. The front end surface of each reduced diameter projection is slanted inward toward the radial outer end thereof. The annular reduced diameter portion 42 is located behind the annular enlarged diameter portion 24 in the unlocked position, and opposite to the annular enlarged diameter portion 24 in the unlocked position as shown in FIGS. 8 and 9, respectively.

The inner bore of the inner circumferential tapered end 44 is tapered toward the rear end such that the inner diameter of the rear end agrees with the inner diameter of the front end of the annular reduced diameter portion 42, and the inner diameter of the front end of the inner circumferential tapered end 44 is greater than the outer diameter of the unloaded hose.

As shown in FIGS. 5 and 6, the two manipulating pieces 36 are circumferentially offset from each other by 180 degrees, and each comprises a main wall 54 and four ribs 56 extending between the main wall 54 and the outer circumferential surface of the lock member 14. The outer surface of the main wall 54 is at an angle of 70 to 80 degrees with respect to the outer circumferential surface of the lock member 14, and extends in parallel with the axial line. Each rib 56 is triangular in shape with one side thereof extending along the rear surface of the main wall 54 and another side thereof extending along the outer circumferential surface of the lock member 14.

The structure for engaging the first engagement portion 20 of the connector main body 12 and the second engagement portion 38 of the lock member 14 is described in the following with reference to FIGS. 2 to 7. This engagement structure provides various functions including a retaining function to retain the lock member 14 to the connector main body 12 in the unlocked position (see FIG. 8), a camming function to axially displace the lock member 14 relative to the connector main body 12 when the lock member 14 is turned relative to the connector main body 12 in a prescribed direction and a detent function to give a tactile indication to the user when the lock member 14 is turned from the unlocked position to the locked position. The first engagement portion 20 and the second engagement portion 38 are each configured to be rotationally symmetric such that a same shape is repeated for each 180 degree rotation. Therefore, in the following description, only one of the two parts of each engagement portion is described as the other part is identical thereto.

The retaining function is achieved by a retaining projection 58 included in the first engagement portion 20, a retaining recess 60 formed behind the retaining projection 58 of the first engagement portion 20, an elastic piece 62 formed in the second engagement portion 38 and an engagement projection 64 projecting radially inward from the elastic piece 62 of the second engagement portion 38. The retaining projection 58 projects radially outward, and is provided with a slanted front end and an upright rear end (see FIG. 2). The retaining recess 60 is defined by the rear end of the retaining projection 58, a slanted circumferential wall 59 located behind the retaining projection 58 and a longitudinal wall 61 located on the right in FIG. 3. As shown in FIG. 3, the left end of the retaining recess 60 extends relatively smoothly to a sliding surface 78 which will be described hereinafter.

The elastic piece 62 of the lock member 14 extends over about one quarter of the circumference thereof, and owing to the presence of the slot 48 axially adjoining the elastic piece 62, is given with an enhanced flexibility. The elastic piece 62 may be considered as a circumferentially extending beam supported at two ends thereof. As the two ends of the elastic piece 62 project more radially outward than the middle point thereof in the neutral condition, the part of the elastic piece 62 other than the engagement projection 64 can stay clear from the first engagement portion 20 when the elastic piece 62 is caused to deflect outward during the process of engaging the first and second engagement portions 20 and 38 to each other. The front end of the engagement projection 64 extends perpendicularly to the axial direction. The rear end of the engagement projection 64 may extend perpendicularly to the axial direction or may be slanted (so that the engagement projection 64 may be able to ride over the retaining projection 58 with ease when fitting the lock member 14 onto the connector main body 12 as will be discussed hereinafter). When seen in plan view as in FIG. 7, the engagement projection 64 is provided with a rectangular shape with one of the free end corners thereof cut into a slanted surface 66. The opposite side of the engagement projection 64 is defined by an upright radial surface.

The camming function is achieved by a cam groove 68 formed in the first engagement portion 20, and a cam follower projection 70 formed in the second engagement portion 38 and configured to be received by the cam groove 68. The cam groove 68 includes an axially extending introduction groove 72 angularly displaced from the engagement projection 58 by 90 degrees and having an open front end, a slanted groove 74 extending from the rear end of the introduction groove 72 both forward and away from the engagement projection 58 in an oblique direction, and a terminal groove 76 extending further from the other end of the slanted groove 74 in a circumferential direction. The cam groove 68 extends over about one quarter of the circumference of the connector main body 12. The cam follower projection 70 projects radially inward from the inner circumferential surface of the second engagement portion 38 at a position angularly displaced from the engagement projection 64 by 90 degrees.

The detent function is achieved by the elastic piece 62 and the engagement projection 64 of the second engagement portion 38, and the introduction groove 72 and the sliding surface 78 of the first engagement portion 20. The sliding surface 78 is defined by a surface which appears as a chord of a circle defined by an outer circumferential surface as seen in cross sectional view, and extends from the retaining recess 60 to an opposing edge of the introduction groove 72 defined by a longitudinal ridge 78a.

How the retaining, camming and detent functions are performed by the first and second engagement portions 20 and 38 is described in the following. First of all, a user fits the lock member 14 onto the front end of the connector main body 12 with the base end of the lock member 14 first, and the cam follower projection 70 and the engagement projection 64 aligned with the introduction groove 72 and the retaining projection 58, respectively. As the cam follower projection 70 advances in the introduction groove 72, the engagement projection 64 rides over the retaining projection 58, and falls into the retaining recess 60. This movement is facilitated by the resiliency of the elastic piece 62 and the slanted front end of the retaining projection 58 (and the slanted rear end of the engagement projection 64 when the engagement projection 64 is so configured). Meanwhile, the cam follower projection 70 reaches the rear end of the introduction groove 72 or the starting point of the slanted groove 74.

At this time, the lock member 14 is kept retained by the connector main body 12 with respect to the axial direction because the engagement projection 64 is engaged by the rear end of the retaining projection 58 and the slanted circumferential wall 59. The circumferential movement of the lock member 14 with respect to the connector main body 12 is restricted by the engagement between the engagement projection 64 and the axial wall 61 on the one hand, and by the engagement between the side wall of the slanted groove 74 and the cam follower projection 70 on the other hand. The hose connector 10 in this condition may be considered to be in the unlocked state. Therefore, the hose connector can be stored and handled in this condition so that the user may be enabled to connect a hose thereto without any prior preparation.

The user then fits an end of a hose into an annular gap defined between the inner tube portion 18 of the connector main body 12 and the outer tube portion 34 of the lock member 14 until the forward end of the hose abuts the shoulder surface 29 of the connector main body 12. This is facilitated by the fact that the free end of the connector main body 12 is formed with an outer circumferential tapered end 26 and that the free end of the lock member 14 is formed with an inner circumferential tapered end 44. Also, because the annular enlarged diameter portion 24 of the connector main body 12 is axially displaced from the reduced diameter portion 42 of the lock member 14, the free end of the hose can be fitted on the inner tubular portion 18 without any significant resistance particularly when the hose is elastic or otherwise flexible. Also, the reduced diameter projections 50 do not substantially obstruct the insertion of the free end of the hose because the front edge of each reduced diameter projection 50 is slanted, and the reduced diameter projections 50 can readily deform in radially outward directions. Furthermore, the outer circumferential surfaces of the outer circumferential tapered end 26 and the intermediate portion 22 of the connector main body 12 are formed with axial ribs 28 and 32, respectively, so that the inner surface of the hose may be fitted on the outer circumferential tapered end 26 and the intermediate portion 22 with a minimum frictional resistance. Owing to such arrangements, the hose can be fully fitted onto the intermediate portion 22 without requiring any undue effort. The windows 46 allow the user to visually confirm that the hose has been fully fitted on the intermediate portion 22 until the front end abuts the shoulder surface 29.

Figure 4:
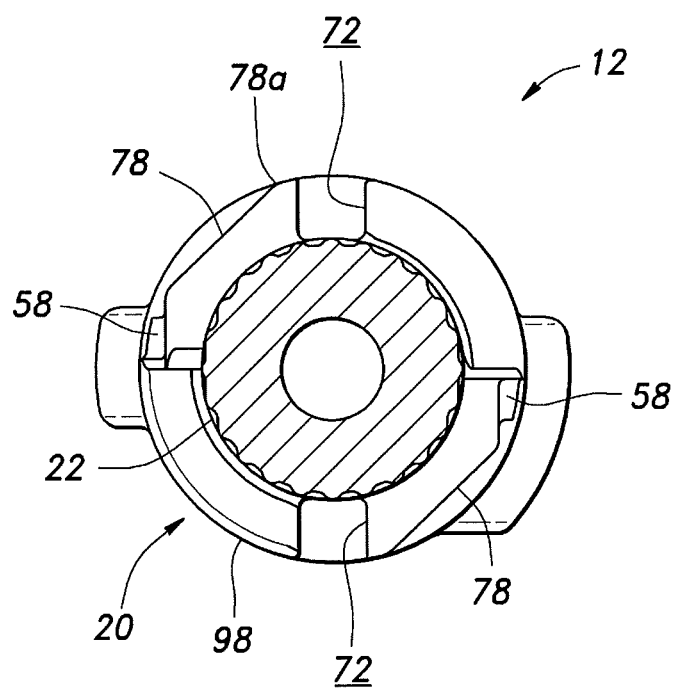
FIG. 4 is a sectional view taken along line IV-IV of FIG. 2.

The user then turns the lock member 14 in clockwise direction as seen in FIG. 4 (in counter clockwise direction as seen in the bottom view of FIG. 7) by about 45 degrees. This causes the cam follower projection 70 to move along the slanted groove 74, and the lock member 14 to move forward. At the same time, the engagement projection 58 is caused to ride over the longitudinal ridge 78*a* and move into the introduction groove 72. This condition may be considered as the locked state of the hose connector 10. This causes the elastic piece 62 to deflect radially outward, and produces a click sound and/or a tactile sensation which the user may perceive as an indication of reaching the locked state. This is facilitated by the fact that the corresponding end of the engagement projection 64 is provided the slanted surface 66. At this time, the cam follower projection 70 is located in the terminal grove 68, and the engagement projection 58 is retained in the introduction groove 72 so that the lock member 14 is held retained in this position with respect to both axial and circumferential directions. The forward movement of the lock member 14 mentioned above causes the annular enlarged diameter portion 24 of the connector main body 12 to come close to or substantially align with the reduced diameter portion 42 of the lock member 14, the hose is firmly clamped between the annular enlarged diameter portion 24 and the reduced diameter portion 42.

In the locked position, the lock member 14 can be turned only by a very small angle with the engagement projection 64 and the cam follow projection 70 received in the introduction groove 72 and the terminal groove 76, respectively. However, as the terminal groove 76 extends circumferentially substantially perpendicularly to the axial direction, the lock member 14 cannot be displaced in the axial direction at all. The rotation of the lock member 14 in the unlocking direction is prevented by the engagement between the engagement projection 64 and the introduction groove 72, but when forcibly turned in the unlocking direction, the lock member 14 is destroyed, and the hose may be removed from the connector main body 12. More specifically, when the lock member 14 is forcibly turned in the unlocking direction, circumferential shear stress is produced in a weakened section 49 of the lock member 14 located between the window 46 and the slot 48, and the weakened section 49 is preferentially ruptured with the result that the lock member 14 is axially split into two pieces (a free end part and a rear end part). If necessary, the weakened section 49 may be provided with a reduced wall thickness as compared to the remaining part of the lock member 14. Even when the weakened section 49 is ruptured, the hose remains firmly clamped between the annular enlarged diameter portion 24 and the reduced diameter portion 42. When the free end part of the ruptured lock member 14 is forcibly pushed rearward, the reduced diameter portion 42 can be axially displaced away from the annular enlarged diameter portion 24 so that the hose may be disengaged from the connector main body 12 without any significant effort.

Modified embodiments of the lock member of the first embodiment are described in the following with reference to FIGS. 10 and 12. In the description of these modified embodiments, the parts corresponding to those of the first embodiment are denoted with like numerals or not denoted with any numerals at all without necessarily repeating the description of such parts.

Figure 10A:
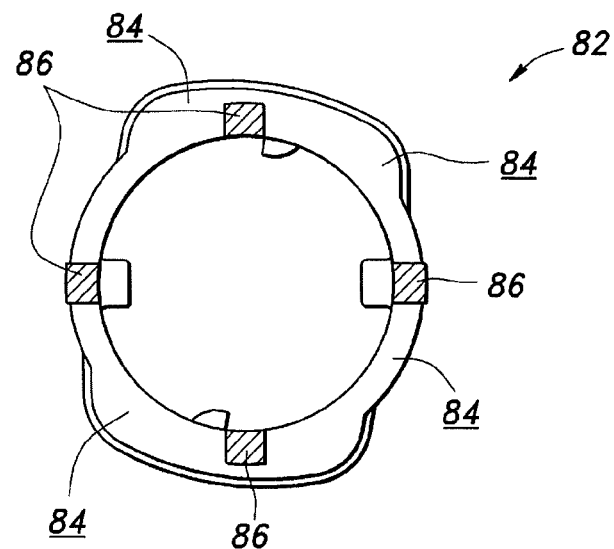
FIGS. 10a and 10b are a sectional plan view taken along line a-a of FIG. 10b and a front view, respectively, of a lock member of a first modified embodiment of the hose connector of the first embodiment.
Figure 10B:
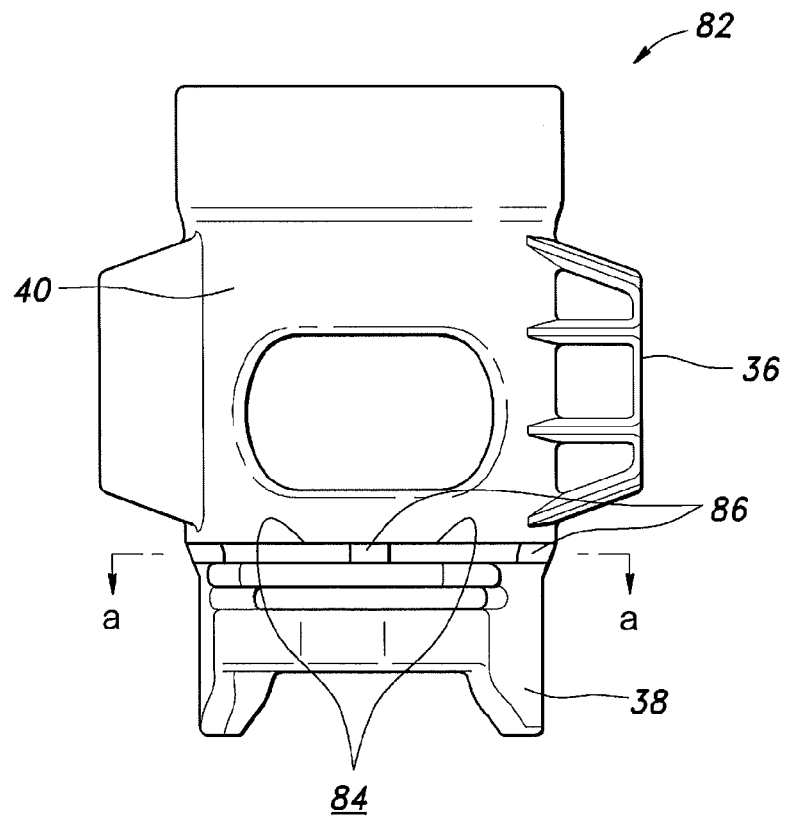

Referring to FIGS. 10*a* and 10*b* showing a lock member 82 given as the first modified embodiment, four second circumferential slots 84 are formed in the part of the tubular main body 40 located between the windows 46 and the first slots 48. A columnar section 86 defined between each pair of adjacent second slots 84 connects the front and rear parts of the tubular main body 40 to each other. Each second slot 84 may extend over an angle of 80 to 89 degrees. When the lock member 82 is turned from the locked position toward the unlocked position, the columnar sections 86 are preferentially ruptured owing to the shear stress acting upon them. Thereafter, the hose can be detached from the hose connector without any difficulty.

Figure 11A:
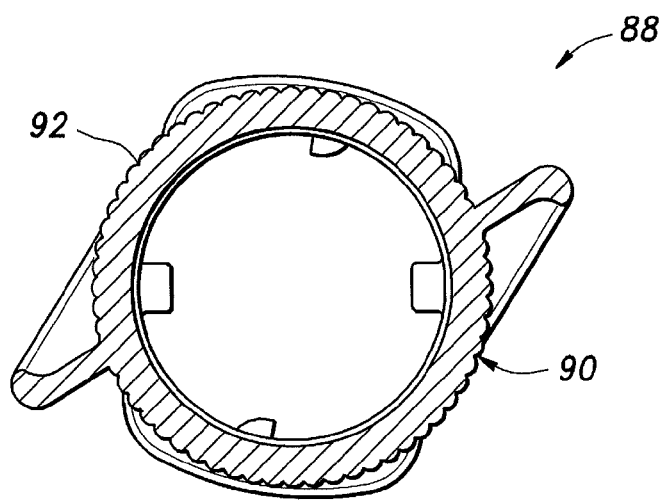
FIGS. 11a and 11b are a sectional plan view taken along line a-a of FIG. 11b and a front view, respectively, of a lock member of a second modified embodiment of the hose connector of the first embodiment.
Figure 11B:
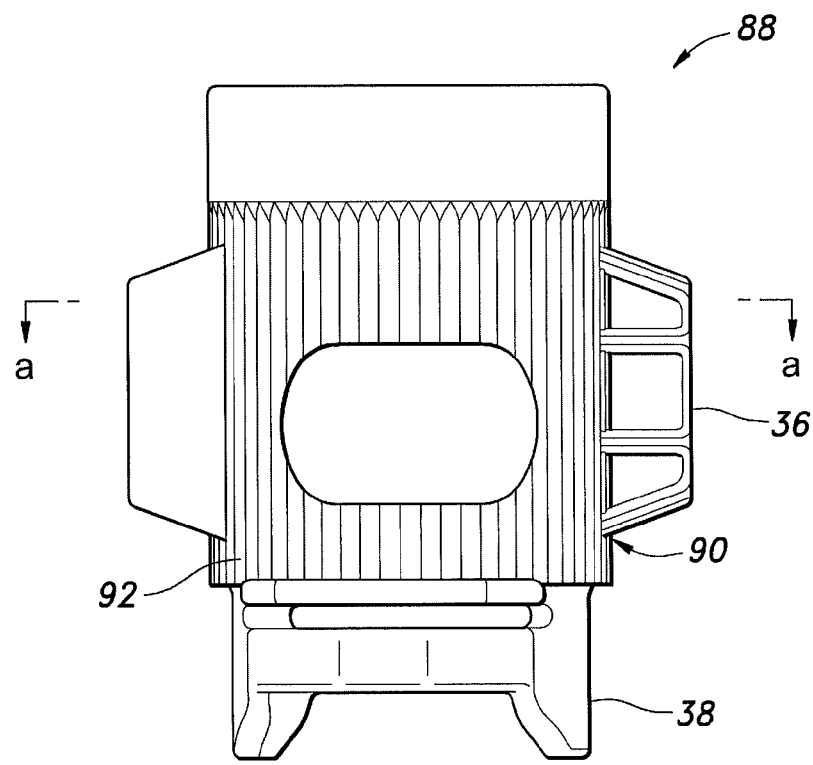

Referring to FIGS. 11*a* and 11*b* showing a lock member 88 given as the second modified embodiment, the outer circumferential surface of the tubular main body 90 of the lock member 88 is formed with a plurality of axial grooves 92 each having a V-shaped cross section. When the lock member 88 is turned from the locked position toward the unlocked position, owing to the tensile stress that acts in the part of the tubular main body 90 located between each manipulating piece 36 and the corresponding engagement projection 64, the lock member 88 is ruptured at one of the axial grooves 92. If desired, the lock member 83 can also be ruptured by causing an adequate stress in the grooves 92 with the aid of a tool. In either case, the hose can be then detached from the hose connector without any difficulty.

Figure 12A:
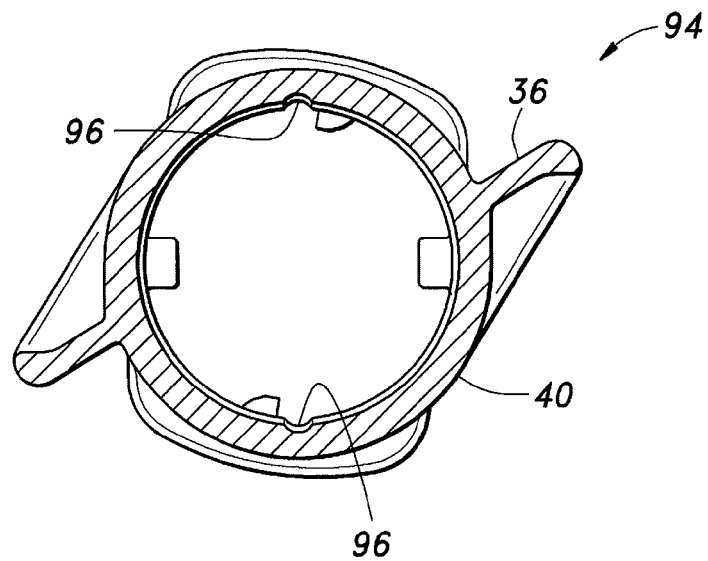
FIGS. 12a and 12b are a sectional plan view taken along line a-a of FIG. 12b and a front view, respectively, of a lock member of a third modified embodiment of the hose connector of the first embodiment.
Figure 12B:
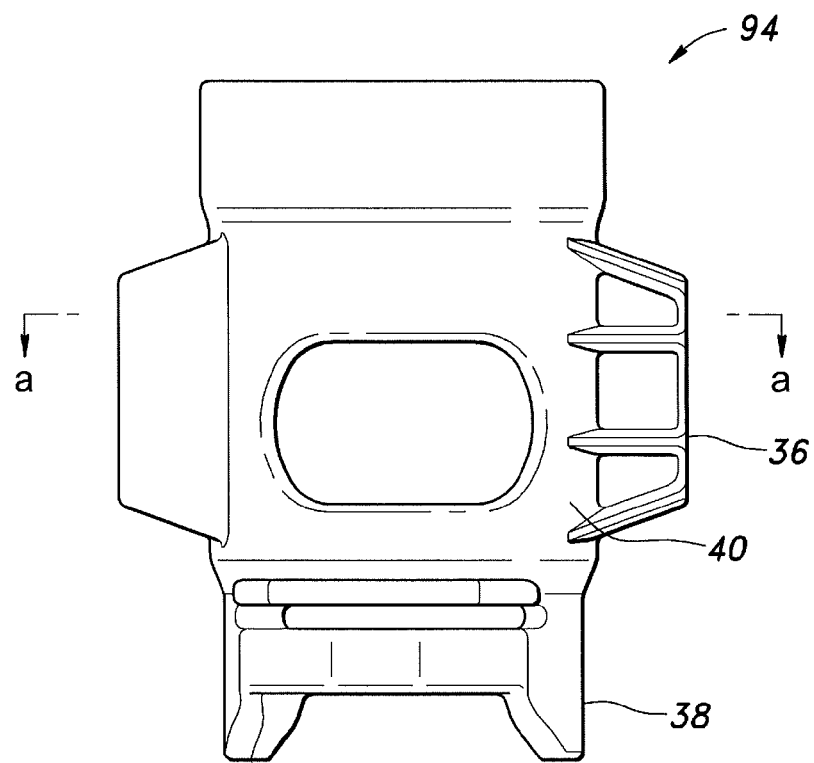

Referring to FIGS. 12*a* and 12*b* showing a lock member 94 given as the third modified embodiment, the outer circumferential surface of the lock member 94 is formed with a pair of thin walled parts 96 extending axially across the tubular main body 40 and the inner circumferential tapered end 44. The thin walled parts 96 may align with the corresponding windows 46. Each thin walled part 96 may extend on only the front side of the corresponding window 46 or on both the front and rear sides of the corresponding window 46. When the lock member 94 is turned from the locked position toward the unlocked position, owing to the tensile stress that acts in each thin walled part 96 located between each manipulating piece 36 and the corresponding engagement projection 64, the lock member 94 is ruptured. If desired, the lock member 94 can also be ruptured by causing an adequate stress in the thin walled part 96 with the aid of a tool. In either case, the hose can be then detached from the hose connector without any difficulty.

Figure 13:
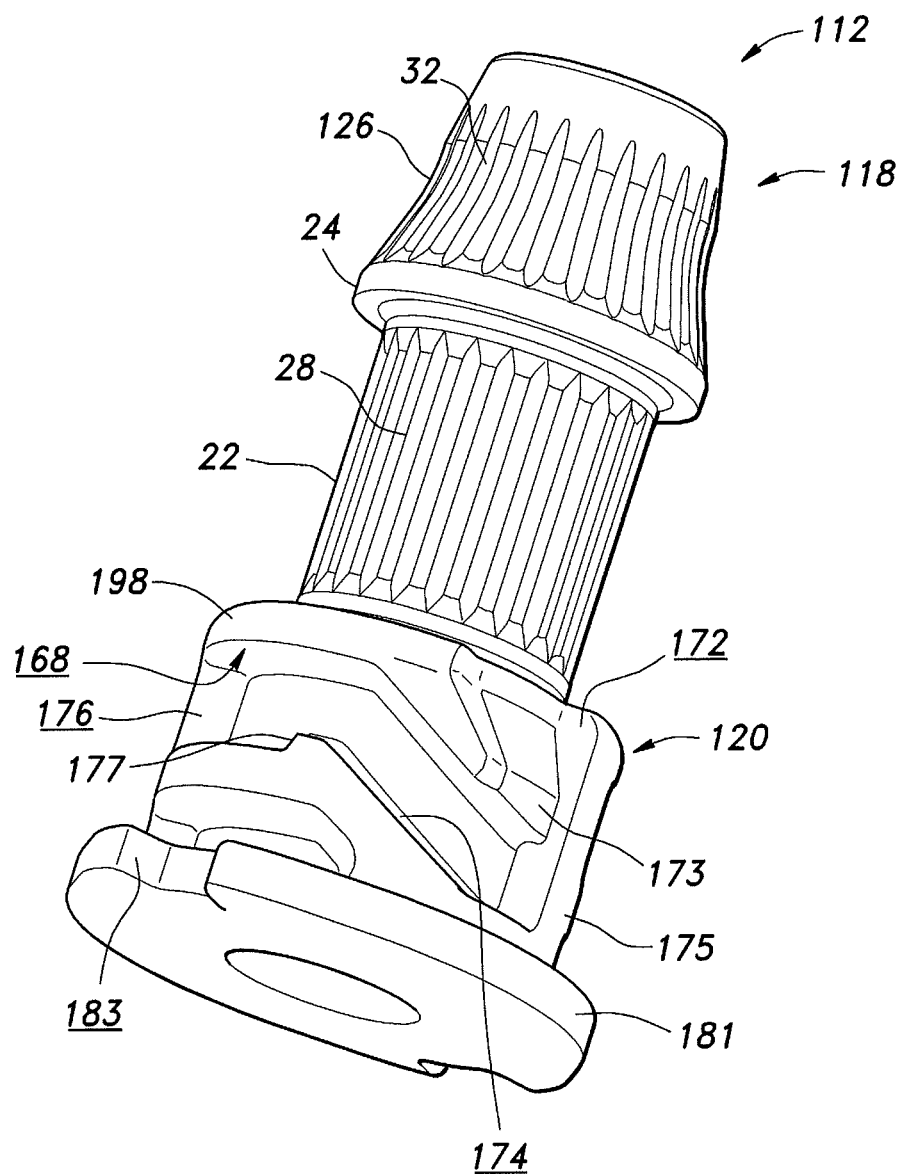
FIG. 13 is a perspective view of a connector main body of a hose connector given as a second embodiment of the present invention.
Figure 14:
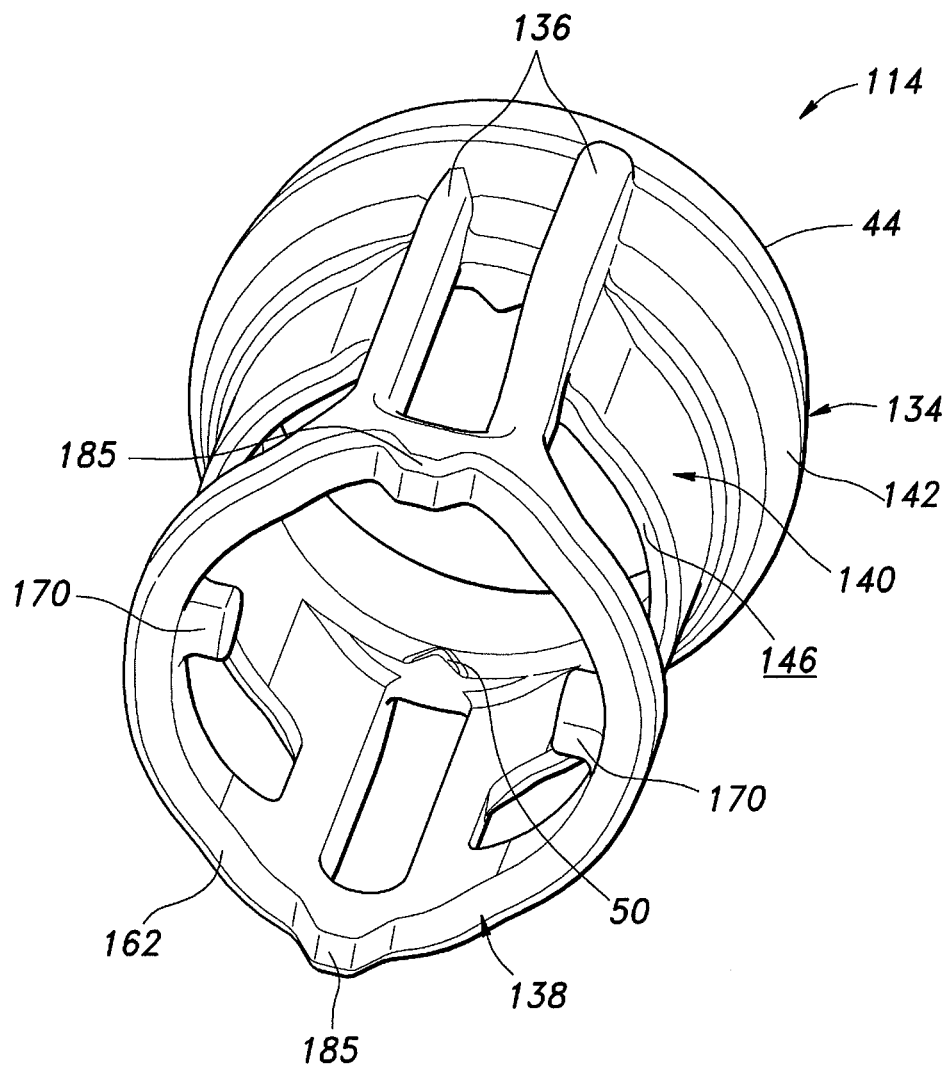
FIG. 14 is a perspective view of a lock member of the hose connector of the second embodiment.

A second embodiment of the hose connector according to the present invention is described in the following with reference to FIGS. 13 and 14. In the description of the second embodiment, the parts corresponding to those of the first embodiment are denoted with like numerals or not without any numeral at all necessarily repeating the description of such parts.

A connector main body 112 comprises an outer tubular portion 118 and a connecting portion (not shown in the drawings) extending from the base end of the outer tubular portion 118 in a coaxial relationship. The connecting portion may be a part of a member or a device. The connecting portion may be either integrally formed with the outer tubular portion 118 or formed as a separate member attached thereto.

The inner tubular member 118 includes a first engagement portion 120, an intermediate portion 22, an annular enlarged portion 24 and an outer circumferential tapered end 126 in that order from the base end thereof. The intermediate portion 22, the annular enlarged portion 24 and the outer circumferential tapered end 126 are similar to the counterparts of the first embodiment except for that the shape of the taper of the outer circumferential tapered end 126 is slightly different (curved).

A lock member 114 comprises an outer tubular portion 134 configured to be loosely fitted on the outer tubular portion 118 of the connector main body 112 when combined with the connector main body 112 and a pair of manipulating pieces 136 extending radially outward from diametrically opposed positions of the outer circumferential surface of the outer tubular portion 134.

The outer tubular portion 134 is provided with an inner circumferential surface opposing the outer circumferential surface of the inner tubular portion 118 of the connector main body 112, and includes a second engagement portion 138, a tubular main body 140, an annular reduced diameter portion 142 and an inner circumferential tapered end 44 in that order from the base end thereof.

The second engagement portion 138 forms a means of engaging the connector main body 112 and the lock member 114 to each other by cooperating with the first engagement portion 120.

The tubular main body 140 is provided with an inner circumferential surface opposing the intermediate portion 22 of the connector main body 112, and is provided with a pair of windows 146 in diametrically opposing parts thereof. The windows 146 allow the intermediate portion 22 of the connector main body 112 to be visually inspected from outside. The windows 146 are each slightly elongated in the circumferential direction, and separate the second engagement portion 138 from the connector main body 112 except for the parts adjoining the base ends of the manipulating pieces 136. In other words, the second engagement portion 138 is connected to the connector main body 112 only in the parts thereof adjoining the manipulating pieces 136.

The reduced diameter portion 142 of the lock member 114 is formed with a pair of reduced diameter projections 50 located at positions aligning with the manipulating pieces 136. In this case, each manipulating piece 136 consists of a pair of plates extending radially and axially from the outer circumferential surface of the tubular main body 140 in a mutually parallel relationship The engagement structure formed jointly by the first engagement portion 120 of the connector main body 112 and the second engagement portion 138 of the lock member 114 is described in the following.

The first engagement portion 120 comprises a disk 181 formed at the base end thereof, and a pair of notches 183 are formed in diametrically opposed positions on the periphery of the disk 181. An irregularly shaped cylindrical member 198 is interposed between the intermediate portion 22 and the disk 181, and a cam groove 168 is formed on the outer circumferential surface of the irregular cylindrical member 198. The cam groove 168 includes an introduction groove 172 extending axially and having an open front end, a slanted groove 174 extending from the rear end of the introduction groove 172 both forward and circumferentially in an oblique direction, and a terminal groove 176 extending further from the other end of the slanted groove 174 in a circumferential direction.

The bottom surface of the introduction groove 172 is slanted upward as one moves in the rearward direction, and the rearmost end of the introduction groove 172 is formed as a flat surface 173. The slanted groove 174 and the terminal groove 176 are both recessed as compared with the flat surface 173, and have an even bottom surface defining an outer circumferential surface of a substantially same radius as that of the intermediate portion 22. Therefore, the boundary between the end of the introduction groove 172 or the flat surface 173 thereof and the adjoining start point of the slanted groove 174 is defined by an upright wall. The side of the introduction groove 172 facing away from the slanted groove 174 is delimited by an axial ridge 175 which extends over the entire axial length of the cylindrical member 198. The side wall of the terminal groove 176 on the rear end side is rearwardly recessed as compared with the adjoining side wall of the end part of the slanted wall 174 thereby defining a should surface 177 circumferentially facing away from the main part of the slanted groove 172.

The second engagement portion 138 of the lock member 114 includes an elastic piece 162 extending circumferentially in a coaxial relationship to the tubular main body 140, and spaced therefrom by the windows 146. The elastic piece 162 is connected to the tubular main body 140 by the manipulating pieces 136. Therefore, the elastic piece 162 forms a pair of beams each supported by the manipulating pieces 136 at two ends thereof. The second engagement portion 138 further includes a pair of cam follower projections 170 projecting radially inward from diametrically opposed positions of the inner circumferential surface of the lock member 114, in particular the middle points of the beams formed by the elastic piece 162, and a pair of axial projections 185 extending from the axial ends of the elastic piece 162 aligning with the manipulating pieces 136, respectively. Each axial projection 185 is provided with a trapezoidal shape having sloped surfaces on either side thereof.

The mode of operation of the second embodiment of the hose connector according to the present invention is described in the following. First of all, a user fits the lock member 114 onto the front end of the connector main body 112 with the base end of the lock member 114 first, and the cam follower projection 170 aligned with the introduction groove 172. As the cam follower projection 170 advances in the introduction groove 172, the cam follower projection 170 rides over the flat surface 173 at the end of the introduction groove 172, and drops into the start point of the slanted groove 174. This movement is facilitated by the resiliency of the elastic piece 162 and the slanted bottom surface of the introduction groove 172. At the same time, the axial projections 185 fit into the corresponding notches 183 of the disk 181.

At this time, the lock member 114 is kept retained by the connector main body 112 with respect to the axial direction because the cam follower projection 170 is engaged by the upright side walls of the starting point of the slanted groove 174 (retaining function). The lock member 114 is also prevented from freely moving in the circumferential direction by the engagement between the axial projections 185 and the notches 183 of the disk 181. The hose connector 10 in this condition may be considered to be in the unlocked state. Therefore, the hose connector 10 can be stored and handled in this condition so that the user may be enabled to connect a hose thereto without any prior preparation.

The user then fits an end of a hose into an annular gap defined between the inner tube portion 118 of the connector main body 112 and the outer tube portion 134 of the lock member 114 until the forward end of the hose abuts a shoulder surface defined by the cylindrical member 198 of the first engagement portion 120. This is facilitated by the fact that the free end of the connector main body 112 is fo rued with an outer circumferential tapered end 126 and that the free end of the lock member 114 is formed with an inner circumferential tapered end 44.

Also, because the annular enlarged diameter portion 24 of the connector main body 112 is axially displaced from the reduced diameter portion 142 of the lock member 114, the free end of the hose can be fitted on the inner tubular portion 118 without any significant resistance particularly when the hose is elastic or otherwise flexible. Also, the reduced diameter projections 50 do not substantially obstruct the insertion of the free end of the hose because the front edge of each reduced diameter projection 50 is slanted, and the reduced diameter projections 50 can readily deform in radially outward directions. Furthermore, the outer circumferential surfaces of the outer circumferential tapered end 126 and the intermediate portion 122 of the connector main body 112 are formed with axial ribs 28 and 32, respectively, so that the inner surface of the hose may be fitted on the outer circumferential tapered end 126 and the intermediate portion 122 with a minimum frictional resistance. Owing to such arrangements, the hose can be fully fitted onto the intermediate portion 122 without requiring any undue effort. The windows 146 allow the user to visually confirm that the hose has been fully fitted on the intermediate portion 122 until the front end abuts the shoulder surface.

The user then turns the lock member 114 in clockwise direction similarly as in the first embodiment by about 45 degrees. This causes the axial projections 185 of the lock member 114 to move out of the notches 183 of the disk 181 of the connector main body 112. This requires a slight effort which can be adjusted by appropriately selecting the sloping angle of the slanted side faces of the axial projections 185. At the same time, the cam follower projection 170 moves along the slanted groove 174 thereby causing the lock member 114 to move forward.

During this process, the hose is progressively clamped between the annular enlarged diameter portion 24 of the connector main body 112 and the reduced diameter portion 142 of the lock member 114, and the elasticity of the hose in turns applies an elastic force to the lock member 114 that urges the lock member 114 in a rearward direction. Eventually, the cam follower projection 170 reaches the terminal groove 176, and the elastic force of the hose causes the cam follower projection 170 to be engaged by the shoulder surface 177. This causes the elastic piece 162 to deflect in the axial direction, and produces a click sound and/or a tactile sensation which the user may perceive as an indication of the cam follower projection 170 reaching the terminal groove 176. This condition may be considered as the locked state of the hose connector 10.

At this time, the cam follower projection 70 is retained in the terminal groove 176 so that the lock member 114 is held retained in this position with respect to both the axial and circumferential directions. The forward movement of the lock member 114 mentioned above causes the annular enlarged diameter portion 24 of the connector main body 112 to come close to or substantially align with the reduced diameter portion 142 of the lock member 114, the hose is firmly clamped between the annular enlarged diameter portion 24 and the reduced diameter portion 142.

In the locked position, the lock member 114 can be turned only by a very small angle with the cam follow projection 170 received in the terminal groove 176. However, as the terminal groove 176 extends circumferentially substantially perpendicularly to the axial direction, the lock member 114 cannot be displaced in the axial direction at all. The rotation of the lock member 114 in the unlocking direction is prevented by the engagement between the cam follow projection 170 and the shoulder surface 177, but when forcibly turned in the unlocking direction, the cam follow projection 170 can ride over the shoulder surface 177 against the elastic force of the hose, and move back into the start position of the slanted groove 174 so that the hose may be removed from the connector main body 112.

At this time, the lock member 114 is put back to the unlocked position, and the annular enlarged diameter portion 24 of the connector main body 112 is axially displaced from the reduced diameter portion 142 of the lock member 114 to such an extent that the hose may be disengaged from the connector main body 112 without any significant effort.

Figure 15A:
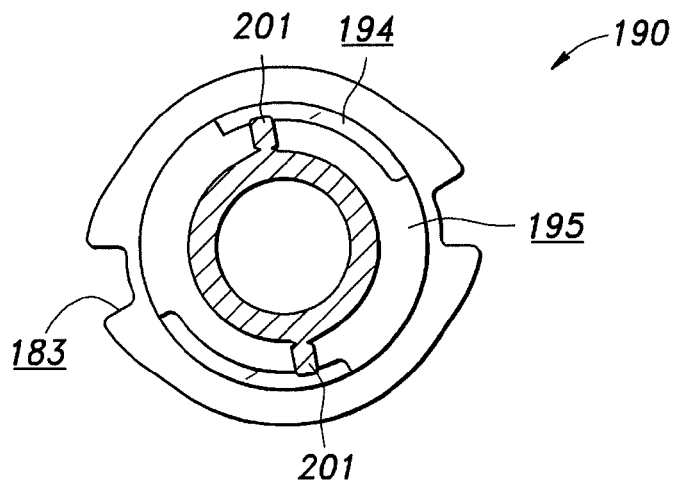
FIGS. 15a and 15b are a sectional plan view taken along line a-a of FIG. 15b and a front view, respectively, of a lock member of a modified embodiment of the hose connector of the second embodiment.
Figure 15B:
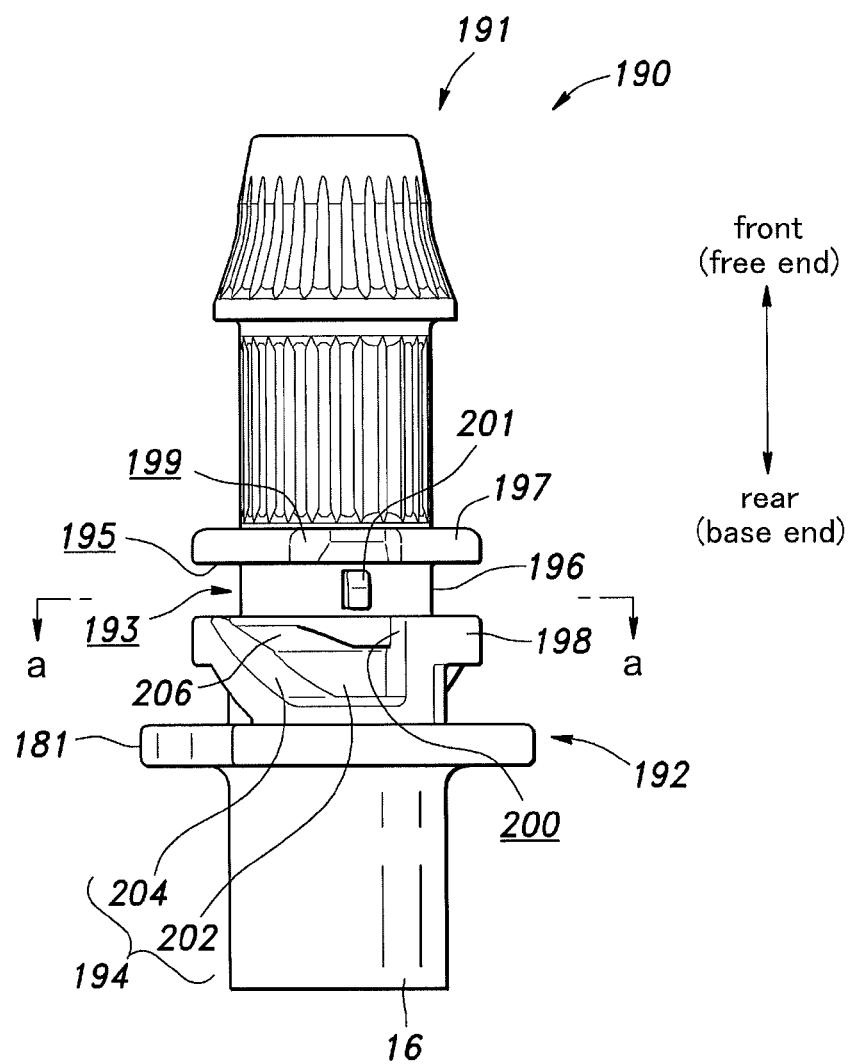

A modified embodiment of the second embodiment of the hose connector according to the present invention is described in the following with reference to FIGS. 15a and 15b. The lock member for this embodiment is identical to that of the second embodiment, and this modified embodiment differs from the second embodiment only in the structure of the first engagement portion 192 of the connector main body 190. Therefore, the parts similar to those of the second embodiment are in most part omitted from the following description. Again, the first engagement portion 192 is configured to be rotationally symmetric such that a same shape is repeated for each 180 degree rotation. Therefore, in the following description, only one of the two parts of the first engagement portion 192 is described as the other part is identical thereto.

The first engagement portion 192 comprises an annular wall 197 projecting radially outward from the front end thereof, a cylindrical member 198 adjoining a rear surface 195 of the annular wall 197 with an annular groove 193 defined therebetween and having a cam groove 194 formed on the outer circumferential surface thereof, and a disk 181 formed in the rear end of the cylindrical member 198. The annular wall 197 is formed with a front recess 199, and a retaining projection 201 projects from a bottom surface 196 of the annular groove 193 in axial alignment with the front recess 199. A rear recess 200 is formed in the front end of the cylindrical member 198 in alignment with both the front recess 199 and the retaining projection 201. The retaining projection 201 is provided with a slanted front end.

The cam groove 194 includes a short circumferential section 202 immediately behind the rear recess 200 and a slanted section 204 extending from the circumferential section 202 to the annular groove 193 in an oblique direction. The bottom surface of the circumferential section of the cam groove 194 is more recessed than the bottom surface of the rear recess 200. The end part of the slanted section 204 of the cam groove 194 is provided with a slanted bottom surface 206 which rises toward the annular groove 193.

The mode of operation of this modified embodiment is described in the following. First of all, a user fits the lock member 114 onto the front end of the connector main body 112 with the base end of the lock member 114 first, and the cam follower projection 170 aligned with the front recess 199. As the cam follower projection 170 advances rearward, the cam follower projection 170 rides over the bottom surface of the front recess 199, the retaining projection 201 and the bottom surface of the rear recess 200, and falls into the circumferential, section 202 of the cam groove 194. This movement is facilitated by the resiliency of the elastic piece 162 and the slanted front end of the retaining projection 201. At the same time, the axial projections 185 of the lock member 114 fit into the corresponding notches 183 of the disk 181.

At this time, the lock member 114 is kept retained by the connector main body 112 with respect to the axial direction because the cam follower projection 170 is engaged by the upright side walls of the circumferential section 202 of the cam groove 194. The lock member 114 is also prevented from freely moving in the circumferential direction by the engagement between the axial projections 185 and the notches 183 of the disk 181. The hose connector 10 in this condition may be considered to be in the unlocked state. Therefore, the hose connector 10 can be stored and handled in this condition so that the user may be enabled to connect a hose thereto without any prior preparation.

The user then fits an end of a hose into an annular gap defined between the inner tube portion 118 of the connector main body 112 and the outer tube portion 134 of the lock member 114 until the forward end of the hose abuts a front shoulder surface defined by the annular wall 197 of the first engagement portion 192.

With the hose thus placed ready to be connected, the user turns the lock member 114 in clockwise direction similarly as in the first embodiment by about 45 degrees. This causes the axial projections 185 of the lock member 114 to move out of the notches 183 of the disk 181 of the connector main body 112. This requires a slight effort which can be adjusted by appropriately selecting the sloping angle of the slanted side faces of the axial projections 185.

At the same time, the cam follower projection 170 moves along the slanted section 204 of the cam groove 194 thereby causing the lock member 114 to move forward. During this process, the resiliency of the hose urges the lock member 114 in a rearward direction as discussed in the description of the second embodiment. Eventually, the cam follower projection 170 rides over the slanted bottom surface 206 at the end of the slanted section 204 of the cam groove 194, and drops into the annular groove 193. This is facilitated by the resiliency of the elastic piece 162, and produces a click sound and/or a tactile sensation which the user may perceive as an indication of the cam follower projection 170 reaching the annular groove 193. This condition may be considered as the locked state of the hose connector 10.

At this time, the cam follower projection 170 is retained against axial movement by the two side walls of the annular groove 193. The friction between the hose and the lock member 114 prevents the circumferential movement of the lock member 114. Even if the lock member 114 is forcibly turned in the circumferential direction, the clamped state of the hose remains unchanged. Therefore, any inadvertent unlocking of the lock member 114 can be avoided.

According to this modified embodiment, when the hose is desired to be removed, the lock member 114 may be destroyed by using a suitable tool.

Thus, according to a primary aspect of the present invention, the hose connector comprises a connector main body, a lock member, a cam mechanism that converts the rotational movement of the lock member into an axial movement thereof, and clamping features formed in the inner and outer circumferential surfaces of the lock member and the connector main body which clamps a hose end by moving axially toward each other. Thereby, the hose end can be connected to a pipe or a pipe-like member with ease in a reliable manner and without requiring a tool.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of the prior art references mentioned in this application are incorporated in this application by reference.

The invention claimed is:

1. A hose connector, comprising:
a connector main body including an inner tubular portion having a first engagement feature formed at a base end of an outer circumference thereof;
a lock member including an outer tubular portion configured to be fitted on the inner tubular portion so as to define an annular gap between an outer circumferential surface of the inner tubular portion and an inner circumferential surface of the outer tubular portion, the outer tubular portion being formed with a second engagement feature configured to engage the first engagement feature;
wherein the first and second engagement features jointly form a cam mechanism that causes the lock member to axially move from an unlocked position to a locked position when the lock member is turned around an axial line thereof in a prescribed direction;
wherein the inner tubular portion is provided with an annular enlarged diameter portion on the outer circumferential surface, and the outer tubular portion is provided with an annular reduced diameter portion on the inner circumferential surface thereof in such a positional relationship that the annular enlarged diameter portion and the annular reduced diameter portion are axially adjacent to each other when the lock member is in the locked position, and axially spaced apart from each other in the unlocked position such that a free end of a hose can be clamped between the annular enlarged diameter portion and the annular reduced diameter portion by inserting a free end of a hose in the annular gap between the outer tubular portion and the inner tubular portion when the lock member is in the unlocked position and turning the lock member in the prescribed direction to the locked position;
wherein one of the first and second engagement features includes a resilient engagement piece configured to retain the connector main body and the lock member to each other by engaging a cooperating piece of the other of the first and second engagement features in the unlocked position; and
wherein the resilient engagement piece comprises a projection formed in a part of a beam member defined by a slot formed in the outer tubular portion of the lock member.

2. The hose connector according to claim 1, wherein the annular enlarged diameter portion and the annular reduced diameter portion are located such that a transition from the unlocked position to the locked position is achieved by a forward movement of the lock member relative to the connector main body.

3. The hose connector according to claim 1, wherein one of the first and second engagement features includes an engagement piece configured to retain the connector main body and the lock member against relative axial movement by engaging a cooperating piece of the other of the first and second engagement features in the locked position.

4. The hose connector according to claim 1, wherein the lock member is provided with a window that exposes a part of the connector main body on which a hose is to be fitted.

5. The hose connector according to claim 1, wherein the inner circumferential surface of the lock member comprises a flared front end, and the outer circumferential surface of the connector main body comprises a tapered front end.

6. A hose connector, comprising:

a connector main body including an inner tubular portion having a first engagement feature formed at a base end of an outer circumference thereof;

a lock member including an outer tubular portion configured to be fitted on the inner tubular portion so as to define an annular gap between an outer circumferential surface of the inner tubular portion and an inner circumferential surface of the outer tubular portion, the outer tubular portion being formed with a second engagement feature configured to engage the first engagement feature;

wherein the first and second engagement features jointly form a cam mechanism that causes the lock member to axially move from an unlocked position to a locked position when the lock member is turned around an axial line thereof in a prescribed direction;

wherein the inner tubular portion is provided with an annular enlarged diameter portion on the outer circumferential surface, and the outer tubular portion is provided with an annular reduced diameter portion on the inner circumferential surface thereof in such a positional relationship that the annular enlarged diameter portion and the annular reduced diameter portion are axially adjacent to each other when the lock member is in the locked position, and axially spaced apart from each other in the unlocked position such that a free end of a hose can be clamped between the annular enlarged diameter portion and the annular reduced diameter portion by inserting a free end of a hose in the annular gap between the outer tubular portion and the inner tubular portion when the lock member is in the unlocked position and turning the lock member in the prescribed direction to the locked position;

wherein one of the first and second engagement features includes a resilient engagement piece configured to retain the connector main body and the lock member to each other by engaging a cooperating piece of the other of the first and second engagement features in the unlocked position;

wherein the cam mechanism comprises a cam follower member provided on the inner circumferential surface of the lock member and a cooperating cam groove formed on the outer circumferential surface of the connector main body; and wherein the resilient engagement piece comprises the cam follower member, and the cooperating piece comprises a part of the cam groove defining a rearwardly facing shoulder surface.

7. A hose connector, comprising:

a connector main body including an inner tubular portion having a first engagement feature formed at a base end of an outer circumference thereof;

a lock member including an outer tubular portion configured to be fitted on the inner tubular portion so as to define an annular gap between an outer circumferential surface of the inner tubular portion and an inner circumferential surface of the outer tubular portion, the outer tubular portion being formed with a second engagement feature configured to engage the first engagement feature;

wherein the first and second engagement features jointly form a cam mechanism that causes the lock member to axially move from an unlocked position to a locked position when the lock member is turned around an axial line thereof in a prescribed direction;

wherein the inner tubular portion is provided with an annular enlarged diameter portion on the outer circumferential surface, and the outer tubular portion is provided with an annular reduced diameter portion on the inner circumferential surface thereof in such a positional relationship that the annular enlarged diameter portion and the annular reduced diameter portion are axially adjacent to each other when the lock member is in the locked position, and axially spaced apart from each other in the unlocked position such that a free end of a hose can be clamped between the annular enlarged diameter portion and the annular reduced diameter portion by inserting a free end of a hose in the annular gap between the outer tubular portion and the inner tubular portion when the lock member is in the unlocked position and turning the lock member in the prescribed direction to the locked position;

wherein one of the first and second engagement features includes a resilient engagement piece configured to retain the connector main body and the lock member against relative rotation by engaging a cooperating piece of the other of the first and second engagement features in the locked position; and wherein the resilient engagement piece comprises a projection formed in a part of a beam member defined by a slot formed in the outer tubular portion of the lock member.

8. A hose connector, comprising:

a connector main body including an inner tubular portion having a first engagement feature formed at a base end of an outer circumference thereof;

a lock member including an outer tubular portion configured to be fitted on the inner tubular portion so as to define an annular gap between an outer circumferential surface of the inner tubular portion and an inner circumferential surface of the outer tubular portion, the outer tubular portion being formed with a second engagement feature configured to engage the first engagement feature;

wherein the first and second engagement features jointly form a cam mechanism that causes the lock member to axially move from an unlocked position to a locked position when the lock member is turned around an axial line thereof in a prescribed direction;

wherein the inner tubular portion is provided with an annular enlarged diameter portion on the outer circumferential surface, and the outer tubular portion is provided with an annular reduced diameter portion on the inner circumferential surface thereof in such a positional relationship that the annular enlarged diameter portion and the annular reduced diameter portion are axially adjacent to each other when the lock member is in the locked position, and axially spaced apart from each other in the unlocked position such that a free end of a hose can be clamped between the annular enlarged diameter portion and the annular reduced diameter portion by inserting a free end of a hose in the annular gap between the outer tubular portion and the inner tubular portion when the lock member is in the unlocked position and turning the lock member in the prescribed direction to the locked position;

wherein one of the first and second engagement features includes a resilient engagement piece configured to retain the connector main body and the lock member against relative rotation by engaging a cooperating piece of the other of the first and second engagement features in the locked position;

wherein the cam mechanism comprises a cam follower member provided on the inner circumferential surface of the lock member and a cooperating cam groove formed on the outer circumferential surface of the connector main body; and wherein the resilient engagement piece comprises the cam follower member, and the cooperating piece cooperating with the resilient engagement piece comprises a side wall of an axially extending section of the cam groove.

9. The hose connector according to claim 8, wherein the lock member is provided with a weakened portion which is configured to be ruptured when the lock member is forcibly turned relative to the connector main body in the locked position.

10. A hose connector, comprising:
- a connector main body including an inner tubular portion having a first engagement feature formed at a base end of an outer circumference thereof;
- a lock member including an outer tubular portion configured to be fitted on the inner tubular portion so as to define an annular gap between an outer circumferential surface of the inner tubular portion and an inner circumferential surface of the outer tubular portion, the outer tubular portion being formed with a second engagement feature configured to engage the first engagement feature;
- wherein the first and second engagement features jointly form a cam mechanism that causes the lock member to axially move from an unlocked position to a locked position when the lock member is turned around an axial line thereof in a prescribed direction;
- wherein the inner tubular portion is provided with an annular enlarged diameter portion on the outer circumferential surface, and the outer tubular portion is provided with an annular reduced diameter portion on the inner circumferential surface thereof in such a positional relationship that the annular enlarged diameter portion and the annular reduced diameter portion are axially adjacent to each other when the lock member is in the locked position, and axially spaced apart from each other in the unlocked position such that a free end of a hose can be clamped between the annular enlarged diameter portion and the annular reduced diameter portion by inserting a free end of a hose in the annular gap between the outer tubular portion and the inner tubular portion when the lock member is in the unlocked position and turning the lock member in the prescribed direction to the locked position;
- wherein one of the first and second engagement features includes an engagement piece configured to retain the connector main body and the lock member against relative axial movement by engaging a cooperating piece of the other of the first and second engagement features in the locked position;
- wherein the cam mechanism comprises a cam follower member provided on the inner circumferential surface of the lock member and a cooperating cam groove formed on the outer circumferential surface of the connector main body; and
- wherein the engagement piece comprises the cam follower member, and the cooperating piece comprises side walls of a circumferential section of the cam groove.

* * * * *